Aug. 7, 1956
W. M. THOMPSON ET AL
2,758,056
EXTRACTION OF PROTEOLYTIC ENZYMES FROM
INSULIN-FREE PANCREAS GLANDS
Filed Dec. 21, 1951
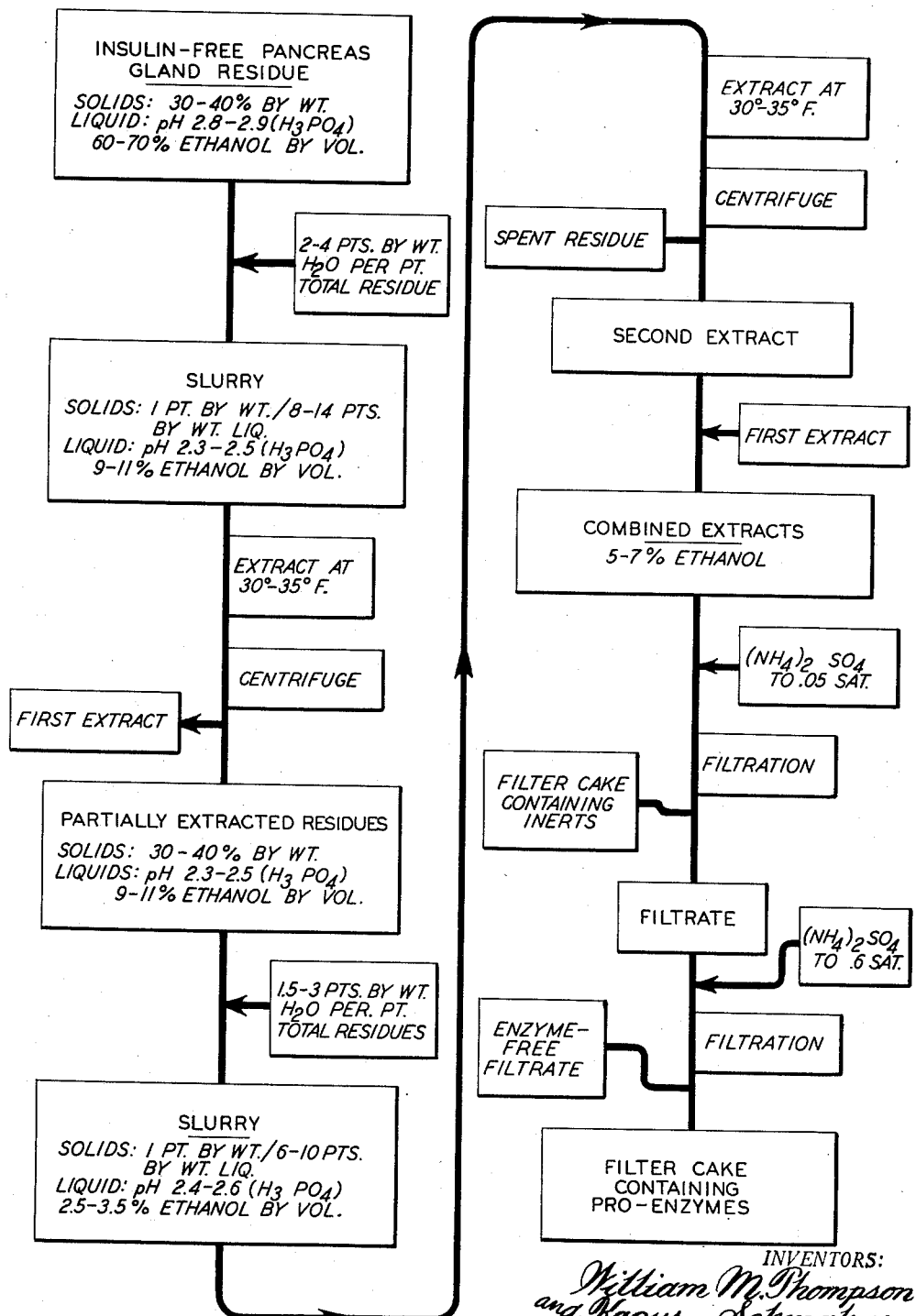
INVENTORS:
William M. Thompson
and Kazys Sekmakas,
BY Carl C. Batz
ATTORNEY.

United States Patent Office 2,758,056
Patented Aug. 7, 1956

2,758,056

EXTRACTION OF PROTEOLYTIC ENZYMES FROM INSULIN-FREE PANCREAS GLANDS

William M. Thompson and Kazys Sekmakas, Chicago, Ill., assignors to Armour and Company, Chicago, Ill., a corporation of Illinois Application December 21, 1951, Serial No. 262,704

10 Claims. (Cl. 195—66)

This invention relates to the extraction of proteolytic enzymes from insulin-free pancreas glands. More particularly, this invention is concerned with the aqueous extraction of enzymes from residues resulting from the extraction of insulin from comminuted pancreas glands of mammals with an acidified, water-miscible organic solvent for insulin. The extraction process of this invention has particular utility in preparing proteolytic enzymes in crystalline form for therapeutic purposes, and especially in preparing crystalline trypsin.

The pancreas glands of mammals, particularly the pancreas glands of cattle, hogs, and sheep, are extracted commercially to obtain insulin and pancreatic enzymes. The enzymes are present in the fresh pancreas glands in the form of pro-enzymes or zymogens, which are the precursors of the active enzymes, such as trypsinogen, chymotrypsinogen B and chymotrypsinogen (alpha chymotrypsinogen), which are respectively the precursors of trypsin, chymotrypsin B and chymotrypsin (alpha chymotrypsin). Other enzymes can also be obtained from pancreas glands such as ribonuclease.

The extraction of insulin from pancreas glands has been much more extensively investigated than the extraction of the proteolytic enzymes. The required conditions for the extraction of insulin from fresh pancreas glands have become well known. In order to prevent the insulin from being destroyed during the extraction, it is necessary to keep the enzymes inactive, that is, in the form of pro-enzymes. Also, to prevent contamination of the insulin extract, it is desirable to minimize the extraction of the pro-enzymes. Both of these objectives are accomplished by using an acidified extracting solvent containing water and from 50 to 85% by volume of a lower alcohol or ketone. The preferred water-miscible organic solvents for insulin are methanol, ethanol, and acetone. In the United States because of its availability, ethanol is used almost exclusively. The high concentration of the organic solvent is believed to be responsible for the insolubilization of the pro-enzymes, while the acidification of the extracting solvent is believed to prevent the activation of the pro-enzymes. The insulin extraction is ordinarily carried out at below pH 4. A number of acids can be satisfactorily employed to adjust the pH of the extracting solvent to the desired value, such as sulphuric, hydrochloric, phosphoric, oxalic, etc.

On the basis of recent discoveries, it is now known that the highest yields of insulin are obtained by using an extracting solvent containing from 60 to 70% ethanol, acidified to below pH 4 with phosphoric acid. The optimum extracting conditions for this system are probably obtained with a 65% ethanol concentration at pH 2.85 with phosphoric acid. The use of phosphoric acid in extracting insulin from pancreas glands is described in detail in co-pending application United States Serial No. 158,928, filed April 28, 1950, now Patent 2,595,278. Also, on the basis of other recent discoveries, oxalic acid has been found to provide unique advantages in the extraction of insulin. The use of oxalic acid for this purpose is described in co-pending application United States Serial No. 244,281, filed August 29, 1951.

In comparison with the extraction of insulin, the conditions for the extraction of proteolytic enzymes from pancreas glands are very poorly understood. Up to a few years ago, it was the practice to prepare crude enzyme mixtures from fresh pancreas glands for use in the tanning and textile industries. The pure crystalline enzymes were not recovered on a commercial basis. In fact, the pancreas gland residues resulting from the extraction of insulin were discarded, and no attempt was made to recover any enzyme preparations from these residues. This may possibly have been due to the belief that the high concentrations of organic solvents and/or the low pH's destroyed the enzymes. During the last few years, however, the insulin-free residues have been used as a source of enzyme preparations. Therefore, it is now definitely established that the enzymes are not destroyed but only precipitated, and can be converted back to their normal pro-enzyme state by reducing the concentration of organic solvent in the liquid portion of the residues to a sufficiently low value, that is, the volumetric ratio of organic solvent to water. A diluent factor enters in to some extent, but in general it has been believed sufficient if the concentration of organic solvent is reduced to below about 20% by volume.

In spite of the fact that it has been known for several years that pro-enzymes could be extracted in the manner indicated above from pancreas gland residues, the performance of the pro-enzymes in a water-organic solvent-acid system is still based entirely on empirical observations, and therefore it is not possible to predict what results will be obtained by varying the components in the system. The commercial production of the enzymes has gone ahead without an adequate understanding of the extraction phenomena. This is probably because of the medical discoveries relating to the uses of crystalline trypsin, and to the pressing demand for other enzymes for clinical work. During the production of enzymes from pancreas residues, it has become clear that it would be desirable to improve the processes employed in a number of ways, but the means for producing the desired improvements have remained obscure. In general, it is desired to obtain a complete extraction of the pro-enzymes, particularly of trypsinogen, without the activation thereof, and with the extraction of a minimum amount of inert contaminants. Another general objective which has become apparent is that of preparing extracts which are particularly suited for the separation of the pro-enzymes (and the preparation of crystalline enzymes therefrom) by salting out procedures.

The method which has been most commonly employed to recover the enzymes from the pancreas residues is carried out by merely adding a sufficient quantity of water to the residues to reduce the concentration of the organic solvent to below 20%, and then maintaining the water-rich solvent in contact with the solids of the residues to solubilize and extract the enzymes. This method, however, has proved to have a number of disadvantages when applied to large scale commercial operations. In the first place, it has been found very difficult to carry the extraction of the enzymes to substantial completion unless a very large volume of water is added to the residues, in which case the relatively great dilution of the residues leads to an excessive extraction of inert contaminants. Secondly, the large volumes required for completing extraction of the residues present handling difficulties in filtration, etc., and require larger and more expensive equipment. Also, it has been found that the extract obtained by this method is not well adapted for recovery of the enzymes by salting out procedures, since uneconomically large amounts of the salts, such as ammonium sulphate and magnesium sulphate, are required; and the presence of varying amounts of the organic solvent presents control problems in carrying out the separations.

More recently, it has been discovered that the process could be considerably improved by subjecting the residues to distillation under reduced pressure, preferably after the addition of water, to remove substantially all of the organic solvent. This procedure provides an answer to a number of the problems discussed above, but is still not entirely satisfactory from a commercial standpoint.

Therefore, it is a general object of this invention to provide an improved extraction process for recovering proteolytic enzymes from pancreas gland residues, which substantially overcomes all of the problems discussed above. More specifically, it is an object of this invention to develop an extraction process by means of which the enzymes can be completely extracted from the residues without their activation, and with the extraction of a minimum amount of inert contaminants. It is a still further object of this invention to provide an extraction process by means of which an extract can be prepared which is particularly suited for the separation of the enzymes by salting out procedures, and which greatly reduces the amount of salts required to obtain the desired separation. Further objects and advantages will appear as the specification proceeds.

During the experimental work leading to this invention, it was discovered that greatly improved results are obtained by extracting the residues a plurality of times with progressively decreasing concentrations of the organic solvent in the extracting solvent. Preferably, the residues are extracted twice, first at an organic solvent concentration below 15%, and second at an organic solvent concentration below 5%. The specific details of this procedures, and the results obtained thereby, will now be discussed.

As previously indicated, the starting material for the process of this invention is insulin-free pancreas gland residues. These residues contain solid pieces of glandular material generally about one-fourth to one-half inch in diameter suspended in an aqueous liquid having a pH below 4 and containing more than 50% by volume of an organic solvent such as methanol, ethanol, and acetone. These residues are usually separated from the supernatant in the insulin extraction process by centrifuging, which results in the production of residues containing about the same ratio of solids to liquid. Generally, the residues will contain about 30 to 40% by weight of solids, or in other words 60 to 70% of the residues will be liquid containing the high concentration of organic solvent. Somewhat dryer residues may sometimes be obtained, and these may possibly contain as little as 50% liquid. However, the residues as obtained from the insulin extraction process can be expected to contain a sufficiently uniform ratio of solids to liquids in a given plant operation so that it is not necessary to determine the ratio of liquids to solids in the residues for each batch of residues to satisfactorily carry out the following process.

The residues of the character described are formed into a slurry which can be circulated by the addition of water thereto. In general, a sufficient amount of water should be added to form a slurry in which the liquid portion contains between 5 to 15% by volume of the organic solvent found in the residues. For best results, the liquid portion of the slurry should contain between about 9 to 11% of the organic solvent. Preferably, the slurry should contain about 8 to 14 parts of liquid to each part of solids, and the optimum consistency of the slurry is obtained when it contains about 10 to 12 parts of liquid to each part of solids.

The slurry for the initial extraction step having the preferred ratio of liquid to solids and having the desired concentration of organic solvent in the liquid portion can be formed in a number of ways. The simplest and most direct method is to add water to the residues to dilute the liquid portion to the desired concentration of between 5 to 15%. For residues of the character ordinarily obtained in the insulin extracting process, as described above, this procedure is entirely satisfactory, and results in the production of a slurry with a satisfactory ratio of liquid to solids at the desired organic solvent concentration. For the purposes of this invention, it is preferred that all of the organic solvent be allowed to remain in the residues, so that it will be present in the slurry for reasons which will subsequently be described in detail. However, other or additional procedures can be employed to form the slurry involving the removal of a portion of the organic solvent from the residues. For example, the residues can first be pressed to remove a part of the liquid portion, and then water can be added to produce the slurry. Alternatively, part of the organic solvent can be removed from the residues by distillation under reduced pressure. Another method which can be used to form the slurry is to first wash the residues with water while maintaining the organic solvent concentration high enough to substantially prevent extraction of the enzymes, separate the residues by centrifugation, and add more water to the residues to form the slurry.

To prevent destruction of the enzymes during the extraction, it is desired to maintain the pH of the slurry on the acid side at least below pH 6.5. Preferably, the pH of the slurry is maintained below pH 4, which has been found to substantially prevent activation of the proenzymes. Usually it will not be necessary to add additional acid to the slurry to adjust it to the preferred pH values, because the residues from the insulin extraction will contain a sufficient quantity of acid for this purpose. In fact, because of the greater ionization in the water-rich slurry as compared to the organic solvent-rich residues, the pH of the slurry may actually be lower than the pH of the residues even though no additional acid is incorporated in the slurry. For example, with a residue in which the liquid portion is acidified to pH 2.85 with phosphoric acid, the dilution of the residues with 3 parts by weight of water to form a slurry containing about 11 parts by weight of liquid to each part by weight of solids will result in a slurry pH of between about 2.3 to 2.5. However, if desired, additional acids can be added to the slurry such as hydrochloric, sulphuric, phosphoric, oxalic, etc., and mixtures of acids can be employed to achieve the desired pH. Preferably, however, either phosphoric or oxalic acid are employed exclusively, since it has been found that when these acids are employed the enzymes are somewhat easier to solubilize and extract, and that somewhat higher yields are thus obtained.

After the formation of the slurry in the manner described, it is desirable to subject it to agitation to bring about the suspension of the solids in the extracting solvent. The slurry can then be passed to suitable extracting equipment. For example, a jacketed tank equipped with an agitator can be satisfactorily employed. Cooling fluid is circulated through the tank jacket to maintain the slurry at a sufficiently low temperature to prevent activation and destruction of the enzymes, and the agitator is operated to maintain the solids in suspension and to cause them to circulate within the tank. If the initial extraction of the residues is carried out in this manner, from 24 to 48 hours will usually be required. However, the extraction time can be shortened by various procedures. Preferably, the slurry is circulated through an impeller-type pump, as described in co-pending application United States Serial No. 259,090, filed November 30, 1951.

Because of the relatively high concentration of organic solvent in the slurry (5 to 15% of the extracting solvent), it is desirable to maintain the slurry at a temperature below 45° F. during the extraction step. Preferably, the temperature of the slurry should be maintained below 40° F., and temperatures down to 25° F. can be employed. However, it is undesirable to bring about the formation of ice in the slurry, so that ordinarily the optimum range will be around 30 to 35° F.

Following the initial extraction, the solids are separated from the extract by centrifugation, which will result in the production of partially extracted residues having approximately the same ratio of liquids to solids as in the residues obtained from the insulin extraction. These partially extracted residues are then re-extracted at least once with an aqueous extracting solvent containing less than 5% by volume of the organic solvent. Preferably, the partially extracted residues are re-extracted once with an aqueous extracting solvent containing from about 2.5 to 3.5% of the organic solvent.

The slurry for the second extraction of the residues can be formed in the same manner as the slurry for the initial extraction, as described above. For the second extraction, however, it is preferable to add a minimum amount of water which will be sufficient to produce a slurry of a consistency which can be pumped. Usually, at least 6 parts of liquid to 1 part of solids will be required in the slurry to permit pumping, although up to 24 parts of liquid to 1 part of solids can be employed. Preferably, the slurry for the second extraction should contain between about 6 to 10 parts by weight of liquid to each part of solids.

During the second extraction the slurry should be maintained at least at a pH below 6.5, and preferably at a pH below 4, as in the initial extraction step. Ordinarily, sufficient acid will be carried through the process from the insulin extraction, so that it will be unnecessary to add additional acid to the partially extracted residues in forming a slurry having a pH below 4. For example, the pH of the slurry for the second extraction when the insulin residues contain phosphoric acid to pH 2.85, would generally be between about pH 2.4 to 2.6. However, other acids can be added if desired, as in the initial extraction.

Because of the lower concentration of organic solvent in the second extraction, somewhat higher temperatures can be employed without destroying the enzymes. Probably the maximum temperatures which can be satisfactorily employed are around 50 to 55° F., but preferably the temperature of the slurry is maintained below 40° F. The optimum temperature conditions for the second extraction are 30 to 35° F.

The second extraction can be carried out by the same extracting technique and with the same apparatus as the initial extraction, that is, a jacketed, agitator-equipped tank can be employed, either alone or in conjunction with an impeller-type pump.

As indicated previously, one of the objectives of this invention is to provide an extraction process in which the extraction of the enzymes can be carried to substantial completion with the extraction of a minimum amount of inert contaminants. Although the explanation of the improved results is not fully understood, the fact has been definitely established that the extraction of the residues a plurality of times at decreasing organic solvent concentrations results in a great decrease in the amount of inert contaminants extracted when the extraction of the enzymes is carried to substantial completion. It is believed that the use of smaller volumes for each extraction and the presence of the organic solvent are important factors in obtaining this result. The preferred ratios of liquid to solids and the preferred concentrations of organic solvent in the liquid portion as set out above have been found to be most effective for minimizing the extraction of inert contaminants during the initial and second extraction, as described above.

Following the second extraction, the residues can be re-extracted if desired, but this is not generally necessary, since two extractions are sufficient to recover all of the enzymes and a further extraction at a low organic solvent concentration will only result in the extraction of an undesirable amount of inert contaminants, while not greatly increasing the yield of enzymes.

The preferred procedure is to separate the spent residues from the second extract by centrifugation, and then to combine the first and second extracts for further processing. The organic solvent concentration in the combined extracts is important, and should be between about 4 to 8% by volume. Preferably, the combined extracts should contain from about 5 to 7% by volume of the organic solvent. It has been discovered that by having the organic solvent concentration of the combined extracts within these ranges that the separation of the enzymes by salting out procedures is greatly facilitated, and a much smaller amount of the salt is required to achieve the separations. It has been found that a variation of organic solvent concentration of the order of from 1 to 4% within the range from 4 to 8% does not interfere with the control of the fractionation of the inert contaminants and enzymes to the extent that a sharp separation cannot be obtained, while at the same time the presence of the organic solvent in concentrations of from 4 to 8% assists the precipitation and supplements the action of the salt.

The preferred procedure for the recovery of the enzymes from the combined extract is to first add ammonium sulphate in an amount sufficient to precipitate out most of the inert contaminants while leaving the enzymes in solution, which are still almost entirely in their inactive form. In aqueous solution substantially free of organic solvent, chymotrypsin B, which is the least soluble of the enzymes, is precipitated out at an ammonium sulphate concentration of between about .25 to .4 saturation. Therefore, when it was desired to recover the chymotrypsin B it was the practice to first adjust the concentration of the extract to about .15 to .2 ammonium sulphate saturation to precipitate the inert contaminants, which were then separated before recovering the enzymes. It has now been discovered that when the extract contains from 4 to 8% organic solvent such as ethanol that the bulk of the inert contaminants are precipitated out by using an ammonium sulphate concentration as low as .025 saturation. Preferably, at least .05 ammonium sulphate saturation is employed to insure that the major portion of the inert contaminants will be precipitated. These inert contaminants are semi-soluble materials which if not precipitated at this point tend to clog the filter press and to pass through the press in the effluent and consequently to interfere with subsequent processing of the extract. However, as already indicated, the semi-soluble contaminants are satisfactorily precipitated by adjusting the ammonium sulphate concentration to at least .025 and preferably to at least .05 saturation. Following their precipitation the inert contaminants are separated by filtration, and then the filtrate is subjected to further treatment to recover the enzymes.

The ammonium sulphate concentration of the filtrate is then adjusted to the required value to precipitate the desired enzyme fraction. Preferably, the entire enzyme spectrum is precipitated at this point. Ribonuclease is the most soluble of the enzymes, precipitating out at between about .7 to .8 ammonium sulphate saturation in pure water. However, due to the presence of the controlled percentage of organic solvent in the extract, all of the enzymes can be precipitated by adjusting the ammonium sulphate concentration of the extract to a considerably lower value. It has been found that at least .5 ammonium sulphate saturation should be employed to insure the precipitation of the ribonuclease, while preferably the concentration should be adjusted to .6 ammonium sulphate saturation. It can thus be seen that a greater saving in the required quantity of ammonium sulphate is accomplished by having from 4 to 8% of the organic solvent in the extract. This is particularly important at this point in the recovery procedure because of the relatively large volumes. After the precipitation of the enzymes, they can be reworked in much smaller volumes, and therefore the required saturation of ammonium sulphate to precipitate the enzymes is of lesser economic importance.

The chymo-trypsinogen and trypsinogen fraction is obtained in organic solvent-free water at between about .4 to .7 ammonium sulphate saturation. Therefore, if it is not desired to recover the ribonuclease, the chymo-trypsinogen and trypsinogen enzymes can be precipitated by adjusting the ammonium sulphate saturation of the extract to a correspondingly lower saturation than those set out above for the precipitation of all of the enzymes.

The precipitated enzymes can be separated from the supernatant by filtration, and the filter cake reworked to obtain the separate enzymes by ammonium sulphate fractionation. Preferably, the enzymes are separated by ammonium sulphate fractionation and further purified by recrystallization. During these procedures, but preferably after the enzymes are separated from each other, they are activated by well known procedures. Thus, active crystalline enzymes of standard potency and stabilized strength can be obtained as final products.

The preferred extraction process as described above down to the separation of the enzymes from the extract is set out in the flow sheet of the accompanying drawing. It will therefore be understood that this flow sheet is merely illustrative of a preferred embodiment of this invention, and is not intended to set out all of the procedural variations falling within the scope thereof.

To more fully illustrate the details of this invention, it is desired to set out the following example:

*Example*

The following procedure has been found to be an excellent one for recovering all of the enzymes from insulin-free pancreas gland residues containing from 30 to 40% by weight of solids and having a liquid portion acidified to pH 2.8 to 2.9 with phosphoric acid and containing about 65% by volume of ethanol. Suspend 1000 lbs. of these residues in 3000 lbs. of water to produce a slurry containing approximately 1 part of solids by weight per 11 parts of liquid, and the liquid portion of the slurry being at a pH of about 2.3 to 2.5 ($H_3PO_4$) and containing 9 to 11% by volume of ethanol. Extract part of the enzymes in the solids into the liquid portion of the slurry by circulating the slurry through an impeller-type pump for from 30 to 60 minutes, either continuously or with an intervening period of from 5 to 15 minutes standing in a tank with the agitation. Alternatively, carry out the extraction by passing the slurry to a brine jacketed extractor tank equipped with an agitator and hold the slurry in the tank for from 24 to 48 hours. Maintain the slurry at a temperature between 30 to 35° F. during the extraction.

Separate the partially extracted residues from the liquid portion of the slurry by centrifugation. Hold the separated extract at a temperature between about 30 to 35° F. for further processing. Suspend the partially extracted solids, which will still weigh approximately 1000 lbs., in 2000 lbs. of water to form a slurry containing about 1 part by weight of solids to 8 parts by weight of liquid, and the liquid portion being at a pH of about 2.4 to 2.6 ($H_3PO_4$) and containing 2.5 to 3.5% by volume of ethanol. Extract substantially all of the remaining enzymes in the solids into the liquid portion by the same means as employed in the initial extraction while maintaining the slurry within the same temperature range as previously.

Discard the residues; combine the second extract with the first extract to obtain an extract containing about 5 to 7% by volume of ethanol, and hold the combined extracts at a temperature between about 30 to 35° F. for further processing.

Slowly add .25 lbs. (.05% sat.) of ammonium sulfate per gallon of the combined extracts with vigorous agitation in order to prevent a localized high concentration and a potential irreversible precipitation of protein. Allow the resultant suspension to settle for from 24 to 48 hours at 30 to 35° F. Separate the precipitated inerts by filtration.

Adjust the ammonium sulfate concentration of the filtrate to .6 ammonium sulfate saturation by the addition of 3½ lbs. of ammonium sulfate per gallon of filtrate in the manner previously described. Allow the resulting suspension to settle for from 24 to 48 hours at 30 to 35° C. Separate the crude enzyme precipitate, containing the precursors of chymotrypsin B, trypsin, chymotrypsin, and ribonuclease, by filtration.

Dissolve the filter cake containing the crude enzymes in 5 cc. of distilled water per gram of cake, and adjust the pH to 2.8 to 3.3 if there is a deviation from this range. Add 150 g. ammonium sulfate per liter of solution to adjust the concentration to 0.4 ammonium sulfate saturation. Make the addition slowly and with vigorous agitation. Continue the agitation for 15 minutes and allow the suspension to settle for an additional 30 minutes before starting the filtration. Then filter the suspension. Wash the filter piece with 10 liters of a 0.4 saturated ammonium sulfate solution. Hold the filter cake, containing the desoxyribonuclease at 23° F. for further processing.

Adjust the concentration of the filtrate to 0.7 ammonium sulfate saturation by adding about 200 g. of ammonium sulfate per liter of filtrate. The addition should be made in the usual manner set out above. Agitate the suspension for 15 minutes and allow it to flocculate over an additional 30 minute period. Filter the material and remove the filter cake, containing the crude trypsinogen and chymotrypsinogen, and hold it at a temperature of 65° F. for further processing. Adjust the concentration of the filtrate to 0.8 ammonium sulfate saturation by adding about 110 g. of ammonium sulfate per liter of filtrate. Agitate the suspension for 15 minutes and allow it to flocculate over an additional 30 minute period. Filter the material and hold the filter cake containing the crude ribonuclease at 23° F. for further processing.

Dissolve the precipitate of purified trypsinogen and chymotrypsinogen in 1.5 cc. of distilled water per gram of cake. Add 0.5 cc. of saturated ammonium sulfate per gram of cake, slowly, while the material is agitated. Adjust the pH of the solution to 5.0 with 5 N sodium hydroxide. Seed the solution with chymotrypsinogen crystals, and hold it for 16 hours at 65° F. for crystallization of the chymotrypsinogen. Separate the crystalline material by vacuum filtration, and hold the chymotrypsinogen crystals at 23° F. for further processing.

To the filtrate from the last step add the following: (1) 1.5 cc. of distilled water per gram of purified cake from the previous step and (2) 1.5 cc. of saturated ammonium sulfate solution per gram of cake. Agitate for 15 minutes and allow 30 minutes for settling. Filter the suspension and discard the precipitate. Add 150 g. of ammonium sulfate per liter of filtrate. Subject the suspension to the previously described agitation and settling periods, and filter the material. Dry the filter cake containing the trypsinogen as completely as possible in preparation for crystallization. Cool the trypsinogen cake to 45° F. Cool a borate buffer solution (pH 9.0) to 60° F., and mix 1.5 cc. of the solution per gram of the trypsinogen cake with minimal agitation at 32° F. Maintain the temperature below 50° F. at all times. Allow the material to stand 16 hours at 32° F. at pH 7.6. Add 1 cc. of saturated magnesium sulfate solution per cc. of buffer cake solution slowly with continuous agitation. Allow the solution to stand 3 to 4 hours at 32° F. If gelatinization appears in the standing solution, or if it is of dark color or dingy appearance, filter the solution. After the removal of the gelatinous material, or if the solution was originally of tan or light color seed the solution with crystalline trypsin and hold it at 5° C. for 48 hours for crystallization. Separate the crystalline trypsin by filtration. If the crystalline solution appears gummy or gelatinous, subject it to centrifugation, and suspend the precipitate in a minimal amount of pH 9.0 borate buffer solution containing an equal volume of sat. magnesium sulfate solution. Filter this suspension and dry it as much as possible. Store the dry filter cake at 23° F. The crystalline trypsin can then be further purified if desired by dialysis to remove the borate buffer salt, and then packaged in vials.

While in the foregoing specification this invention has been described in considerable detail for purpose of illustrating specific embodiments thereof, it will be apparent to those skilled in the art that many of the details set forth can be varied widely without departing from the spirit of the invention.

We claim:

1. In a process for extracting pancreatic enzymes of the group consisting of ribonuclease and the proteolytic pro-enzymes trypsinogen, chymotrypsinogen B and alpha chymotrypsinogen from residues resulting from the extraction of insulin from pancreas glands with a water-miscible organic solvent for insulin, the steps of extracting the solids of said residues with an aqueous extracting solvent containing from 5 to 15% by volume of said organic solvent to obtain an extract containing part of the enzymes in said solids, separating the partially extracted solids from seat extract, re-extracting the separated solids with an aqueous extracting solvent containing less than 5% by volume of said organic solvent to obtain an extract containing an additional amount of said enzymes, and then recovering said enzymes from said first-mentioned and second-mentioned extracts.

2. The process of claim 1 in which said organic solvent is ethanol.

3. In a process for extracting pancreatic enzymes of the group consisting of ribonuclease and the proteolytic pro-enzymes trypsinogen, chymotrypsinogen B and alpha chymotrypsinogen from residues resulting from the extraction of insulin from pancreas glands with a water-miscible organic solvent for insulin, the steps of extracting the solids of said residues with an aqueous extracting solvent containing from 5 to 15% by volume of said organic solvent to obtain an extract containing part of the enzymes in said solids, separating the partially extracted solids from said extract, re-extracting the separated solids with an aqueous extracting solvent containing less than 5% by volume of said organic solvent to obtain an extract containing an additional amount of said enzymes, then combining said first-mentioned and second-mentioned extracts, and recovering at least part of said enzymes from the combined extracts.

4. The process of claim 3 in which said organic solvent is ethanol.

5. In a process for extracting pancreatic enzymes of the group consisting of ribonuclease and the proteolytic pro-enzymes trypsinogen, chymotrypsinogen B and alpha chymotrypsinogen from insulin-free pancreas gland residues, said residues containing at least 50% liquid by weight and said liquid containing at least 50% by volume of a water-miscible organic solvent for insulin, the steps of adding water to said residues to form a slurry in which the liquid portion contains from 5 to 15% by volume of said organic solvent, extracting part of the enzymes from the glandular solids in said slurry into the liquid portion thereof to obtain an initial extract, separating the partially extracted solids from said extract, re-extracting the separated solids with an aqueous extracting solvent containing less than 5% by volume of said organic solvent to obtain a second extract containing an additional amount of said enzymes, combining said initial and said second extracts, and recovering said enzymes from the combined extracts.

6. The process of claim 5 in which said organic solvent is ethanol.

7. In a process for extracting pancreatic enzymes of the group consisting of ribonuclease and the proteolytic pro-enzymes trypsinogen, chymotrypsinogen B and alpha chymotrypsinogen from insulin-free pancreas gland residues containing at least 50% liquid by weight at a pH below 4, said liquid containing from 50 to 85% by volume of ethanol, the steps of adding water to said residues to form a slurry containing from 8 to 14 parts by weight of liquid to each part of solids and with the liquid portion containing from 5 to 15% by volume of said ethanol, passing said slurry into an extraction zone to extract part of the enzymes in said solids into the liquid of said slurry to obtain an extract from which said enzymes can be recovered, separating the partially extracted solids from said extract, adding water to said separated solids to form a slurry containing at least 6 parts by weight of liquid to each part of solids and less than about 5% by volume of ethanol in said liquid, passing said second-mentioned slurry into an extraction zone to extract an additional amount of enzymes into the liquid portion of said slurry to obtain another extract from which the enzymes can be recovered, separating said second-mentioned extract from the spent solids, then combining said first-mentioned and said second-mentioned proextracts, and recovering said enzymes from the combined extracts.

8. In a process for extracting pancreatic enzymes of the group consisting of ribonuclease and the proteolytic pro-enzymes trypsinogen, chymotrypsinogen B and alpha chymotrypsinogen from insulin-free pancreas gland residues comprising a mixture of glandular solids and a liquid containing water in admixture with at least 50% by volume of ethanol, the steps of extracting the solids of said residues with from 8 to 14 parts by weight of an aqueous extracting solvent containing 9 to 11% by volume of said ethanol to obtain an extract containing part of the enzymes in said solids, separating the partially extracted solids from said extract, re-extracting the separated solids with from 6 to 10 parts by weight of an aqueous extracting solvent containing between about 2.5 to 3.5% by volume ethanol to obtain another extract containing an additional amount of said enzymes, separating said second-mentioned extract from the spent solids, then combining said first-mentioned extract and said second-mentioned extract, and recovering the enzymes from said combined extracts.

9. In a process for extracting pancreatic enzymes of the group consisting of ribonuclease and the proteolytic pro-enzymes trypsinogen, chymotrypsinogen B and alpha chymotrypsinogen from residues resulting from the extraction of insulin from comminuted pancreas glands with an extracting solvent containing from 50 to 85% by volume of ethanol acidified to below pH 4 with phosphoric acid, the steps of adding water to said residues to form an extracting solvent in contact with said residues containing from 5 to 15% by volume of said ethanol, extracting a part of the enzymes from the glandular solids into said extracting solvent, separating the partially extracted solids from the extracting solvent, adding water to the separated solids to form another extracting solvent in contact with said residues containing less than 5% by volume of said ethanol, extracting the bulk of the remaining portion of enzymes in said glandular solids into said extracting solvent, separating the spent residues from said extracting solvent, then combining both of said extracting solvents to form an extract containing from 4 to 8% by volume of ethanol, adding ammonium sulphate to said extract to at least .025 saturation to precipitate the inert contaminants in said extract, separating the precipitated material from the extract, and treating the extract with ammonium sulphate to recover the enzymes therein.

10. In a process for extracting pancreatic enzymes of the group consisting of ribonuclease and the proteolytic pro-enzymes trypsinogen, chymotrypsinogen B and alpha chymotrypsinogen from residues resulting from the extraction of insulin from comminuted pancreas glands with an extracting solvent containing from 50 to 85% by volume of ethanol acidified to below pH 4 with phosphoric acid, the steps of adding water to said residues to form an extracting solvent in contact with said residues containing from 5 to 15% by volume of said ethanol, extracting a part of the enzymes from the glandular solids into said extracting solvent, separating the partially extracted solids from the extracting solvent, adding water to the separated solids to form another extracting solvent in contact with said residues containing less than 5% by volume of said ethanol, extracting the bulk of the remaining portion of enzymes in said glandular solids into said extracting solvent, separating the spent residues from said extracting solvent, then combining both of said extracting solvents to form an extract containing from 4 to 8% by volume of ethanol, adding ammonium sulphate to at least .5 saturation to precipitate the inert contaminants in said extract, separating the precipitated material by filtration, adding ammonium sulphate to the filtrate to adjust the ammonium sulphate concentration thereof to at least .05 saturation to precipitate the enzymes therein, and recovering the precipitated enzymes.

References Cited in the file of this patent

UNITED STATES PATENTS

| | | |
|---|---|---|
| 1,929,003 | Neugebauer et al. | Oct. 3, 1933 |
| 2,506,877 | Keil et al. | May 9, 1950 |
| 2,524,658 | Frederiksen | Oct. 3, 1950 |
| 2,571,126 | Frederiksen | Oct. 16, 1951 |
| 2,573,099 | Frederiksen | Oct. 30, 1951 |
| 2,595,278 | Maxwell et al. | May 6, 1952 |

OTHER REFERENCES

Northrop et al.: "Crystalline Enzymes," 1948, pages 96–99.

Tauber: "Chemistry and Technology of Enzymes," 1949, pages 140 to 151.